United States Patent Office 3,082,240
Patented Mar. 19, 1963

3,082,240
PROCESS FOR THE PRODUCTION OF
PHOSPHORIC ACID ESTERS
Walter Lorenz, Wuppertal-Vohwinkel, and Gerhard Schrader, Wuppertal-Cronenberg, Germany, assignors to Farbenfabriken Bayer Aktiengesellschaft, Leverkusen, Germany, a corporation of Germany
No Drawing. Filed Apr. 17, 1961, Ser. No. 103,193
Claims priority, application Germany Apr. 16, 1960
2 Claims. (Cl. 260—461)

The present invention relates to and has as its objects a new and useful process for the production of thio- or seleno-phosphoric or phosphonic acid esters especially of compounds of this type useful as pesticides.

Various processes for the production of thio- or seleno-phosphoric or -phosphonic acid esters are already known from the literature. These compounds are e.g. produced preferably by starting from corresponding mercaptans or selenoles and reacting the latter with dialkyl-phosphoric acid or dialkyl-thiophosphoric acid halides:

$$R'-S(Se)Me + Hal-P\begin{matrix}O(S)\\ \|\\ \end{matrix}\begin{matrix}OR\\ \\OR\end{matrix} \longrightarrow$$

$$R'S(Se)-P\begin{matrix}O(S)\\ \|\\ \end{matrix}\begin{matrix}OR\\ \\OR\end{matrix} + MeHal$$

(in these formulae R and R' stand for organic radicals). From German Patent No. 817,057 and U.S. Patent No. 2,680,132 these reactions are known.

Since working with free mercaptans or selenoles is unwanted sometimes, especially on account of their strong bad odour, attempts have been made to provide a process which avoids the use of mercaptans.

In accordance with the present invention it has now been found that broadly aliphatic, aromatic, aliphatic-aromatic or heterocyclic disulfides or diselenides generally react with salts of phosphites or thiolphosphites in such a manner that the sulfide linkage or the selenide linkage is split and the mercaptan or selenole radical formed is added directly to the phosphorus atom.

$$R'-S-S-R' + \begin{matrix}RO\\ \\RO\end{matrix}\begin{matrix}O(S)\\ \|\\ \end{matrix}P-Me \longrightarrow \begin{matrix}RO\\ \\RO\end{matrix}\begin{matrix}O(S)\\ \|\\ \end{matrix}P-S-R' + R'-SMe$$
(Se—Se)           (Se)           (Se)

In the above formulae R' stands for any alkyl, aryl, aralkyl or heterocyclic radical possibly substituted, and R stands for an alkyl or aryl radical; Me denotes a monovalent metal radical, chiefly an alkali metal.

The aforesaid reaction may also be applied to phosphonites or thiophosphonites.

$$R'-S-S-R' + \begin{matrix}R''\\ \\RO\end{matrix}\begin{matrix}S(O)\\ \|\\ \end{matrix}P-Me \longrightarrow \begin{matrix}R''\\ \\RO\end{matrix}\begin{matrix}S(O)\\ \|\\ \end{matrix}P-S-R' + R'-S-Me$$
(Se—Se)           (Se)           (Se)

(R'' stands here for an aliphatic or aromatic radical; the other symbols have the aforesaid significance), whereby the corresponding phosphonic acid derivatives are obtained.

The aforesaid reaction is new and surprising and generally proceeds quantitatively, and a loss in yields occurs in general only in the course of working up the reaction products. The reaction proceeds exothermically and starts already at low temperatures. The process is advantageously carried out in the presence of suitable inert solvents. As such suitable solvents the following have been found especially satisfactory: alcohols, hydrocarbons such as benzene and toluene, or chlorinated hydrocarbons such as methylene chloride.

The reaction does not need to start from salts of phosphites, thiolphosphites or the corresponding phosphonites, but also the free phosphites or thiolphosphites (or the corresponding phosphonites) may be used. The reaction then is carried out in the presence of an approximately stoichiometrical amount of a suitable acid-binding agent, for example an alkali metal alcoholate.

From U.S. Patent No. 2,865,950 it is already known that ethylene disulfide reacts with trialkyl-phosphites at higher temperatures in such a manner that the disulfide is split and an addition to the phosphorus atom occurs:

$$\begin{matrix}CH_2-CH_2\\ |\quad\quad|\\S---S\end{matrix} + C_2H_5O-P\begin{matrix}C_2H_5O\\ \\ \\C_2H_5O\end{matrix} \longrightarrow \begin{matrix}C_2H_5O\\ \\ \\C_2H_5O\end{matrix}\begin{matrix}O\\ \|\\ \end{matrix}P-S-CH_2-CH_2-SC_2H_5$$

As it is to be seen the reaction according to the present invention fundamentally differs from that disclosed in the above mentioned U.S. Patent No. 2,865,950.

By the inventive method a great number of disulfides or diselenides are applicable to the described reaction, whilst according to the aforementioned U.S. Patent No. 2,865,-950 only specified disulfides can be reacted.

By the new inventive method there are obtained many well known insecticides in a very practical way. Also new compounds not prepared as yet can be produced by this new method.

The following examples are given for the purpose of illustrating the process according to the invention.

Example 1

$$C_2H_5S-CH_2-CH_2-S-P\begin{matrix}S\\ \|\\ \end{matrix}\begin{matrix}OC_2H_5\\ \\OC_2H_5\end{matrix}$$

73 grams (0.3 mol) of di-(2-ethylmercaptoethyl)-disulfide (B.P. 86° C./0.01 mm. Hg) and 48 grams (0.315 mol) of diethyl-thiolphosphite are dissolved in 200 cc. of benzene. While cooling with ice water there are added dropwise at a temperature of 20° C. but not exceeding 30° C., an amount of sodium methylate corresponding to 0.3 mol of sodium. After briefly further stirring at 20° C., the mixture is washed neutral with water, separated and dried over sodium sulfate. After distilling off the solvent, 85 grams of a colorless oil remain which has a distinct boiling point of 87° C./0.01 mm. Hg. Yield 78 grams corresponding to 94.8% of the theoretical, $n_D^{20}$ 1.5330.

Calculated for mol 274.4: S, 35.09%; P, 11.29%. Found: S, 35.39%; P, 10.76%.

Example 2

$$C_2H_5S-CH_2-CH_2-S-P\begin{matrix}S\\ \|\\ \end{matrix}\begin{matrix}OCH_3\\ \\OCH_3\end{matrix}$$

73 grams (0.3 mol) of di-(2-ethylmercaptoethyl)-disulfide (B.P. 86° C./0.01 mm. Hg) and 40 grams (0.315 mol) of dimethyl-thiolphosphite are dissolved in 200 cc. of benzene. An amount of sodium methylate corresponding to 0.33 mol of sodium is added dropwise at −5 to 0° C. The mixture is stirred at 0° C. for a further 10 minutes, washed neutral with water, dried over sodium sulfate and distilled. 66 grams of an oil is obtained which distils at 77° C./0.01 mm. Hg without first runnings or residue. Yield, 64 grams (97% of the theoretical; $n_D^{20}$ 1.5501.

Example 3

$$C_2H_5S-CH_2-CH_2-S-P\begin{matrix}O\\ \|\\ \end{matrix}\begin{matrix}OC_2H_5\\ \\OC_2H_5\end{matrix}$$

44 grams (0.181 mol) of di-(2-ethylmercaptoethyl)-disulfide and 28 grams (0.21 mol) of diethyl-phosphite are dissolved in 200 cc. of benzene. An amount of sodium methylate corresponding to 0.2 mol of sodium is added dropwise at 0 to +5° C. Stirring is continued at 0° C. for a further 10 minutes. The mixture is then washed neutral with water, dried over sodium sulfate and the solvent distilled off. 41 grams of an oil is obtained as residue which is fractionated. 4 grams of ethylmercapto-ethyl-methyl-sulfide ($n_D^{20}$ 1.5188) boil at 25° C./0.01 mm. Hg as first runnings, whilst the ester distils at 85° C./0.01 mm. Hg. Yield 35 grams (75% of the theoretical); $n_D^{20}$ 1.5027.

*Example 4*

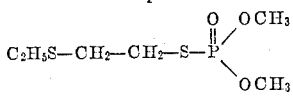

73 grams (0.3 mol) of di-(2-ethylmercaptoethyl)-disulfide and 36 grams (0.33 mol) of dimethylphosphite are dissolved in 200 cc. of benzene. An amount of sodium methylate corresponding to 0.33 mol of sodium is added dropwise at 0 to +5° C. The mixture is stirred at 0° C. for a further 10 minutes, washed neutral, and the solvent is distilled off. The residual oil (40 grams) is fractionated by distillation. 16 grams of ethylmercapto-ethyl-methyl-thioether (B.P. 25° C./0.01 mm. Hg; $n_D^{20}$ 1.5162) and 17 grams of O.O-dimethyl-S-(2-ethylmercaptoethyl)-thiolphosphate ($n_D^{20}$ 1.5110) are thus obtained. Yield 24.7% of the theoretical.

*Example 5*

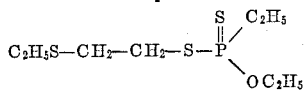

48.5 grams (0.2 mol) of di-(2-ethylmercapto-ethyl)-disulfide and 29 grams (0.21 mol) of ethyl-thiophosphonous acid ethyl ester (B.P. 58° C./3 mm. Hg) are dissolved in 150 cc. of benzene. An amount of sodium methylate corresponding to 0.21 mol of sodium is added dropwise at 0 to +5° C. The mixture is stirred at 0° C. for a further 10 minutes, washed neutral with water, dried over sodium sulfate and distilled. B.P. 81° C./0.01 mm. Hg; $n_D^{21}$ 1.5512. Colorless water-insoluble oil. Yield 47 grams (90.8% of the theoretical).

By the same way but starting from the corresponding phosphonous ester the following compound is obtained:

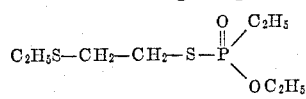

*Example 6*

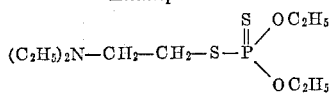

53 grams (0.2 mol) of di-(2-diethylaminoethyl)-disulfide (B.P. 75° C./0.01 mm. Hg) and 34 grams (0.21 mol) of diethyl-thiolphosphite are dissolved in 200 cc. of benzene. An amount of sodium methylate corresponding to 0.21 mol of sodium is added dropwise at 0 to +5° C. After stirring for a further 15 minutes, the mixture is washed neutral, dried and distilled. 56 grams of the ester are thus obtained as a colorless oil of B.P. 73° C./0.01 mm. Hg. Yield 98.2% of the theoretical.

Calculated for mol 285.4: S, 22.46%; P, 10.85%; N, 4.91%. Found: S, 22.30%; P, 10.63; N, 5.13%.

*Example 7*

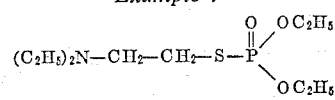

53 grams (0.2 mol) of di-(2-diethylaminoethyl)-disulfide and 31 grams (0.21 mol) of diethylphosphite are dissolved in 200 cc. of benzene. An amount of sodium methylate corresponding to 0.21 mol of sodium is then added dropwise at −5 to 0° C. The mixture is stirred at 0° C. for a further 10 minutes and then washed with a little ice-cold water. After drying over sodium sulfate, 44 grams of an oil are obtained which boils at 76° C./0.01 mm. Hg without first runnings or residue. The ester is water-soluble. Yield 81.8% of the theoretical.

*Example 8*

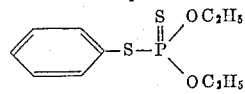

66 grams (0.3 mol) of diphenyl-disulfide and 48 grams (0.315 mol) of diethyl-thiolphosphite are suspended in 200 cc. of methanol. An amount of sodium methylate corresponding to 0.315 mol of sodium is then added dropwise at 0 to +5° C. The mixture is stirred at 0° C. for a short time, then poured into water, and the precipitated oil is taken up in benzene. The benzene solution is shaken twice with 50 cc. of a 2 N sodium hydroxide solution each time and finally again washed neutral. It is dried over sodium sulfate and distilled; B.P. 75° C./0.01 mm. Hg; colorless oil somewhat smelling of thiophenol; $n_D^{21}$ 1.5661. Yield 72 grams (92.3% of the theoretical).

*Example 9*

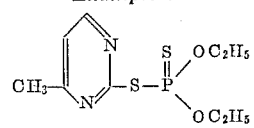

45 grams (0.18 mol) of di-(6-methyl-pyrimidyl-2)-disulfide of M.P. 114° C. (disulfide of the thioliptol base) and 30.4 grams (0.2 mol) of diethyl-thiolphosphite are dissolved in 200 cc. of methylene chloride. An amount of sodium methylate corresponding to 0.2 mol of sodium is then added dropwise at 20–25° C. with cooling. Stirring is continued at room temperature for 30 minutes, and the methylene chloride is distilled off. The residue is dissolved in water and the insoluble oil taken up in petroleum ether. The petroleum ether is briefly washed with a 2 N sodium hydroxide solution, dried over sodium sulfate and distilled off. The ester boils at 98° C./0.01 mm. Hg as a pale yellow, water-insoluble oil. Yield 43 grams (86% of the theoretical).

*Example 10*

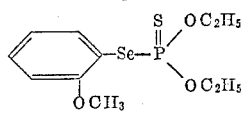

112 grams (0.3 mol) of 2.2'-dimethoxy-diphenyl-diselenide (M.P. 82° C.) are suspended in 250 cc. of methanol. After the addition of 48 grams (0.31 mol) of diethyl-thiolphosphite, an amount of sodium methylate corresponding to 0.32 mol of sodium is added at 5–10° C. while cooling. Stirring is continued at 5–10° C. for one hour until the diselenide dissolves, the reaction product is poured into water and the oil taken up in benzene. The solvent is washed with a 2 N sodium hydroxide solution until no precipitate and cloudiness occurs upon acidification. The product is then washed neutral with water, dried over sodium sulfate and distilled. B.P. 108° C./0.01 mm. Hg. Orange-colored oil. Yield 90 grams (88.2% of the theoretical).

Calculated for mol 339.2: Se, 23.48%; S, 9.45%; P, 9.13%. Found: Se, 23.52%; S, 9.32%; P, 8.99%.

*Example 11*

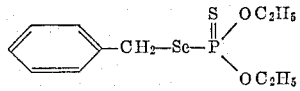

102 grams (0.3 mol) of dibenzyl-diselenide (M.P. 94° C.) and 48 grams (0.31 mol) of diethyl-thiolphosphite are dissolved or suspended in 250 cc. of methanol. An amount of sodium methylate corresponding to 0.32 mol of sodium is then added dropwise at 0–10° C. After stirring for half an hour at 50° C. water is added and the oil taken up in petroleum ether after cooling. It is washed with a 2 N sodium hydroxide solution until a sample shows no further cloudiness upon treatment with dilute hydrochloric acid. The product is finally washed neutral with water, dried over sodium sulfate and distilled; B.P. 98° C./0.01 mm. Hg. Pale yellow, water-insoluble oil. Yield 76 grams corresponding to 78.5% of the theoretical.

Calculated for mol 323.3: Se, 24.42%. Found: Se, 24.69%.

*Example 12*

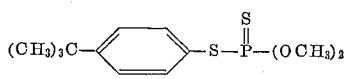

99 grams (0.3 mol) of 4.4′-tert.-butyl-diphenyl-disulfide (M.P. 86° C.) and 42 grams (0.33 mol) of dimethylthiolphosphite are dissolved in 200 cc. of benzene. An amount of sodium methylate corresponding to 0.315 mol of sodium is then added dropwise at 0–10° C. The mixture is stirred at 0° C. for a short time, washed first with water, then twice with a 2 N sodium hydroxide solution and finally with water until neutral, dried over sodium sulfate and fractionated; B.P. 103° C./0.01 mm. Hg; colorless, water-insoluble oil. Yield 72 grams (82.8% of the theoretical).

Calculated for mol 290.4. S, 22.08%; P, 10.66%. Found: S, 22.26%; P, 10.44%.

We claim:
1. A process for forming a compound of the formula

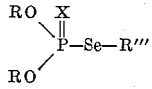

wherein each R is lower alkyl, X is a member selected from the group consisting of oxygen and sulfur and R‴ is a benzyl radical, which comprises contacting a dibenzyl diselenide with a member selected from the group consisting of dilower alkyl thiolphosphite and dilower alkyl phosphite in the presence of an acid binding agent.

2. A process for forming a compound of the formula

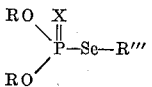

wherein each R is lower alkyl, X is a member selected from the group consisting of oxygen and sulfur and R‴ is a phenyl radical, which comprises contacting a diphenyl diselenide with a member selected from the group consisting of dilower alkyl thiolphosphite and dilower alkyl phosphite in the presence of an acid binding agent.

References Cited in the file of this patent
UNITED STATES PATENTS 2,494,284     Cassaday et al. _____ Jan. 10, 1950

OTHER REFERENCES

Michalski et al.: "Chem. Abst.," vol. 53, col. 17,884–17,885 (1959).